(12) United States Patent
Yousefian

(10) Patent No.: US 11,589,958 B2
(45) Date of Patent: Feb. 28, 2023

(54) PHARYNGOROFACIAL EXPANDER APPLIANCE AND PROTOCOL

(71) Applicant: Joseph Yousefian, Bellevue, WA (US)

(72) Inventor: Joseph Yousefian, Bellevue, WA (US)

(\*) Notice: Subject to any disclaimer, the term of this patent is extended or adjusted under 35 U.S.C. 154(b) by 123 days.

(21) Appl. No.: 16/993,927

(22) Filed: Aug. 14, 2020

(65) Prior Publication Data

US 2021/0196432 A1 Jul. 1, 2021

Related U.S. Application Data

(60) Provisional application No. 62/955,733, filed on Dec. 31, 2019.

(51) Int. Cl.
*A61C 7/10* (2006.01)

(52) U.S. Cl.
CPC .................................... *A61C 7/10* (2013.01)

(58) Field of Classification Search
CPC ....................................................... A61C 7/10
See application file for complete search history.

(56) References Cited

U.S. PATENT DOCUMENTS

| | | |
|---|---|---|
| 3,454,001 A | 7/1969 | Stockfisch |
| 3,477,129 A | 11/1969 | Rubin |
| 3,832,778 A | 9/1974 | Wallshein |
| 3,977,082 A | 8/1976 | Siatkowski |
| 4,348,179 A | 9/1982 | Nardella |
| 4,433,956 A | 2/1984 | Witzig |
| 4,571,178 A | 2/1986 | Rosenberg |
| 4,988,291 A | 1/1991 | Grummons |
| 5,002,485 A | 3/1991 | Aagsen |
| 5,158,451 A | 10/1992 | Pourcho |
| 5,399,087 A | 3/1995 | Arndt |
| 5,439,377 A | 8/1995 | Milanovich |
| 5,564,920 A | 10/1996 | Klapper et al. |
| 5,645,422 A | 7/1997 | Williams |
| 5,683,244 A | 11/1997 | Truax |
| 5,769,631 A | 6/1998 | Williams |
| 5,816,800 A | 10/1998 | Brehm et al. |

(Continued)

FOREIGN PATENT DOCUMENTS

WO 2013117791 A1 8/2013

OTHER PUBLICATIONS

International Search Report and Written Opinion of international application PCT/US16/23462 dated Aug. 12, 2016.

(Continued)

*Primary Examiner* — Heidi M Eide
(74) *Attorney, Agent, or Firm* — Timothy E. Siegel Patent Law, PLLC; Timothy E. Siegel

(57) ABSTRACT

Embodiments of bone anchored expander devices described herein along with the protocol provide improved orthodontic/orthopedic appliances and protocol for expanding or contracting, protracting or retracting, extruding or intruding the upper jaw and dental arch unilaterally or bilaterally in parallel or non-parallel way, as well as enlarging the nasal cavity and nasopharyngeal airway. This expander design and protocol gives the clinician the ability to direct expansion or constriction, protraction or retraction, extrusion or intrusion forces to various segments of the maxillary jaw and arch in parallel or nonparallel configuration minimizing the need for major osteotomies.

18 Claims, 8 Drawing Sheets

(56) References Cited

U.S. PATENT DOCUMENTS

| | | | |
|---|---|---|---|
| 5,829,970 A | 11/1998 | Yousefian | |
| 6,033,216 A | 3/2000 | Souris | |
| 6,109,916 A | 8/2000 | Wilcko et al. | |
| 6,220,856 B1 | 4/2001 | Carano | |
| 6,302,687 B1 | 10/2001 | King | |
| 6,358,255 B1 | 3/2002 | Testa | |
| 6,402,510 B1 | 6/2002 | Williams | |
| 6,520,772 B2 | 2/2003 | Williams | |
| 6,976,838 B1 | 12/2005 | Keles | |
| 7,121,824 B2 | 10/2006 | Keles | |
| 7,331,781 B1 | 2/2008 | Bandeen | |
| 7,500,851 B2 | 3/2009 | Williams | |
| 7,712,468 B2 | 5/2010 | Hargadon | |
| 8,529,252 B2 | 9/2013 | Bukhary | |
| 8,821,155 B2 | 9/2014 | Mitani | |
| 8,833,374 B2 | 9/2014 | Fallon et al. | |
| 10,004,574 B2 | 6/2018 | Yousefian | |
| 10,010,383 B2 | 7/2018 | Yousefian | |
| 10,098,711 B2 | 10/2018 | Yousefian | |
| 10,456,218 B1 | 10/2019 | Mashouf | |
| 10,478,270 B2 | 11/2019 | Yousefian | |
| 10,569,661 B2 | 2/2020 | Mochizuki | |
| 10,646,308 B2 | 5/2020 | Yousefian | |
| 2002/0031741 A1 | 3/2002 | Williams | |
| 2003/0050641 A1 | 3/2003 | Mommaerts | |
| 2003/0194675 A1 | 10/2003 | Williams | |
| 2004/0048222 A1* | 3/2004 | Forster | A61C 7/10 433/7 |
| 2007/0218416 A1 | 9/2007 | Keles | |
| 2008/0060659 A1 | 3/2008 | Bonato et al. | |
| 2008/0220388 A1* | 9/2008 | Weissbach Otte | A61C 7/10 433/7 |
| 2010/0261133 A1 | 10/2010 | Lax | |
| 2013/0252195 A1 | 9/2013 | Popat | |
| 2014/0186788 A1 | 7/2014 | Sheibani | |
| 2014/0190490 A1 | 7/2014 | Walker et al. | |
| 2014/0326253 A1 | 11/2014 | Baratier et al. | |
| 2015/0075540 A1 | 3/2015 | Dye | |
| 2015/0231179 A1 | 8/2015 | Sahin | |
| 2017/0056236 A1 | 3/2017 | Yousefian | |
| 2018/0311014 A1 | 11/2018 | Yousefian | |
| 2018/0368945 A1* | 12/2018 | Moon | A61C 7/02 |
| 2020/0078139 A1 | 3/2020 | Yousefian | |

OTHER PUBLICATIONS

The International Search Report and the Written Opinion of the International Searching Authority (Australia) for PCT/US2020/066834, dated Mar. 1, 2021.

* cited by examiner

PHARYNGOROFACIAL EXPANDER APPLIANCE AND PROTOCOL

RELATED APPLICATIONS

This application claims benefit of application U.S. Ser. No. 62/955,733 filed on Dec. 31, 2019, which is incorporated by reference as if fully set forth herein.

BACKGROUND

Orthodontists and dental researchers are constantly searching for new and improved ways to correct the problem of upper and lower jaw transverse constriction or anteroposterior deficiencies with collapsed dental arches and faces causing narrow jaws, deficient faces causing narrow upper airway disorders including sleep disordered breathing, including obstructive sleep apnea.

Currently, expansion of the maxilla relies on rapid palatal expander devices that deliver forces to break the mid-palatal and circummaxillary sutures to facilitate transverse and sagittal dentofacial correction.

Current orthodontic or orthopedic devices for spreading the jaws, dental arches, or upper airways have not been entirely satisfactory because patients frequently have a dentofacial issue with several aspects, and such devices are typically designed to treat only a single aspect of a deformity, leaving other aspects still needing treatment. That is, currently available devices are incapable of simultaneously performing any two of the following actions: 1) bone anchored expansion, 2) contraction in side-to-side (transverse) extent, 3) protraction or retraction in front to back (sagittal) and intrusion or 4) extrusion in up and down (vertical) directions bilaterally or unilaterally, in parallel or unparallel action. As a result, in most cases with deficient transverse, sagittal and vertical maxillary or mandibular jaw or arch form deficiencies, during the correction, the discrepancy in one or two directions will be left without having been properly treated.

SUMMARY

Embodiments of bone anchored expander devices described herein provide improved orthodontic/orthopedic appliances and protocol for expanding or contracting, protracting or retracting, extruding or intruding the jaws and dental arches unilaterally or bilaterally in parallel or non-parallel way, as well as enlarging the nasal cavity and upper nasopharyngeal airway.

This expander design gives the clinician the ability to direct expansion or constriction, protraction or retraction, extrusion or intrusion forces to various segments of the maxillary arch in parallel or nonparallel configuration.

In some embodiments described herein, expander devices provide an arch spreading or contracting device and protocol that is simple in structure and use, that avoids the defects and insufficiencies of the presently available devices, and that, at the same time, are capable of differential parallel or non-parallel expansion or contraction of the upper jaw and dental arch.

In some embodiments described herein, expander devices provide a jaw and dental arch spreading capability that not only addresses the dentition and the jaw bones, but also reshapes and expands the nasal cavity and palatal soft tissue, as well as enlarging the nasal airway and behind the soft palate airway (retropalatal), behind the tongue (retroglossal) and bellow the tongue (hypoglossal). This can be accomplished by enlarging the mouth and accommodating the position of the tongue forward out of the pharynx, and by enlarging the airway behind the tongue (retroglossal) and below and behind the tongue (hypoglossal). This will contribute in enlarging the nasopharyngeal airway by expanding the environment of the upper airway starting from nostrils, nasal cavity retropalatal area, retroglossal area, and hypoglossal area.

In some embodiments described herein, expander devices provide a jaw and dental arch spreading capability that can open or close the extraction sites.

In some embodiments described herein, expander devices provide an upper jaw and dental arch protraction and advancement capability that by supporting the lips improve the unaesthetic results of previously extracted bicuspid which caused dished in and concave facial profile in upper and lower jaws.

In some embodiments described herein, expander devices provide an intrusion and extrusion capability of the upper and lower teeth bilaterally or unilaterally, to improve the anterior open bites, or unilateral or bilateral posterior open bites or level the canted occlusal planes or improve the gummy smile or reduce the excessive lower facial vertical height.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The detailed description set forth below, in connection with the appended drawings, where like numerals reference like elements, are intended as a description of various embodiments of a pharyngorofacial expander 10, according to the present invention and are not intended to represent the only embodiments. Each embodiment described in this disclosure is provided merely as an example or illustration and should not be construed as precluding other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result. Likewise, unless otherwise noted, any steps described herein are not limited to a particular order, such that steps may be rearranged in some instances to achieve the same or substantially similar result.

In the following description, specific details are set forth to provide a thorough understanding of exemplary embodiments of the present invention. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to directions, such as "forward," "rearward," "upper," "lower," "left," "right," etc. These references, and other similar directional references in the present application, are only to assist in helping describe and to understand the particular embodiment and are not intended to limit the present disclosure to these directions or locations. The transverse expansion screw 14 is considered the center of the device, with the term "proximal" indicating a feature that is closer to expansion screw 14, and the term "distal" indicating a feature that is further from expansion screw 14, along the extension of the expander 10.

Figure 1:
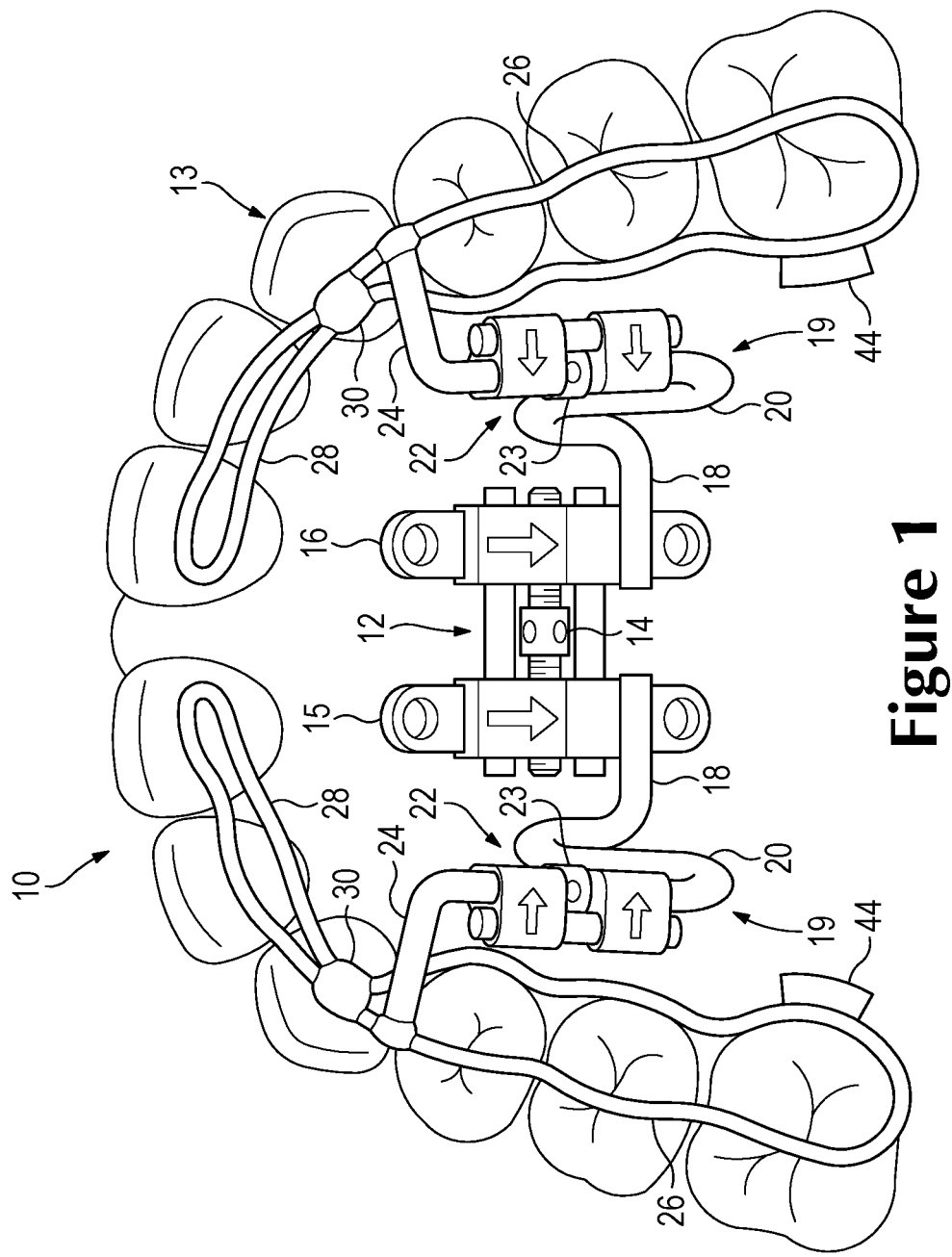
FIG. 1 is a bottom view of a maxillary pharyngorofacial expander, according to the present invention, placed against the upper teeth and palate of a patient.

Referring to FIG. 1, a first embodiment of a palatal pharyngorofacial expander 10 is shown against the upper palate and teeth 13 of a human patient, as they might appear after an earlier course of orthodontia in which the second bicuspids were removed in previous orthodontic treatment and the remaining teeth were repositioned to fill in the resultant gap. The third molars (wisdom teeth) have also been removed. Expander 10 includes a transverse expander assembly 12 that may be attached to the palatal bones of the patient via left palatal attachment plate 15 or right palatal attachment plate 16 or both. A pair of stiff wire proximal portion 18 of an extending arm 19 is rigidly attached to right and left attachment plate 16, 15, respectively. The wire 18, which is resiliently deformable, includes a spring portion 20, that may be in the form of a curved zig-zag as shown, in the form a 360° curl, or in some other form that permits spring action. Wire 18 extends further to a section that is sagittally oriented (that is, parallel to the center plane of the palate). Each arm 19 includes a sagittal expansion section 22, connecting wire 18 with a distal wire 24 that forms the mesial portion of arm 19. Each expansion section 22 includes an expansion screw 23, similar to expansion screw 14. The distal wires 24 are attached to the occlusal and lingual wire extension 26, which are bonded to the occlusal and lingual of the upper back teeth and extension wire 28 which is attached to the lingual of front teeth. The wires 26 and 28 are soldered together at the junctions 30.

Figure 2:
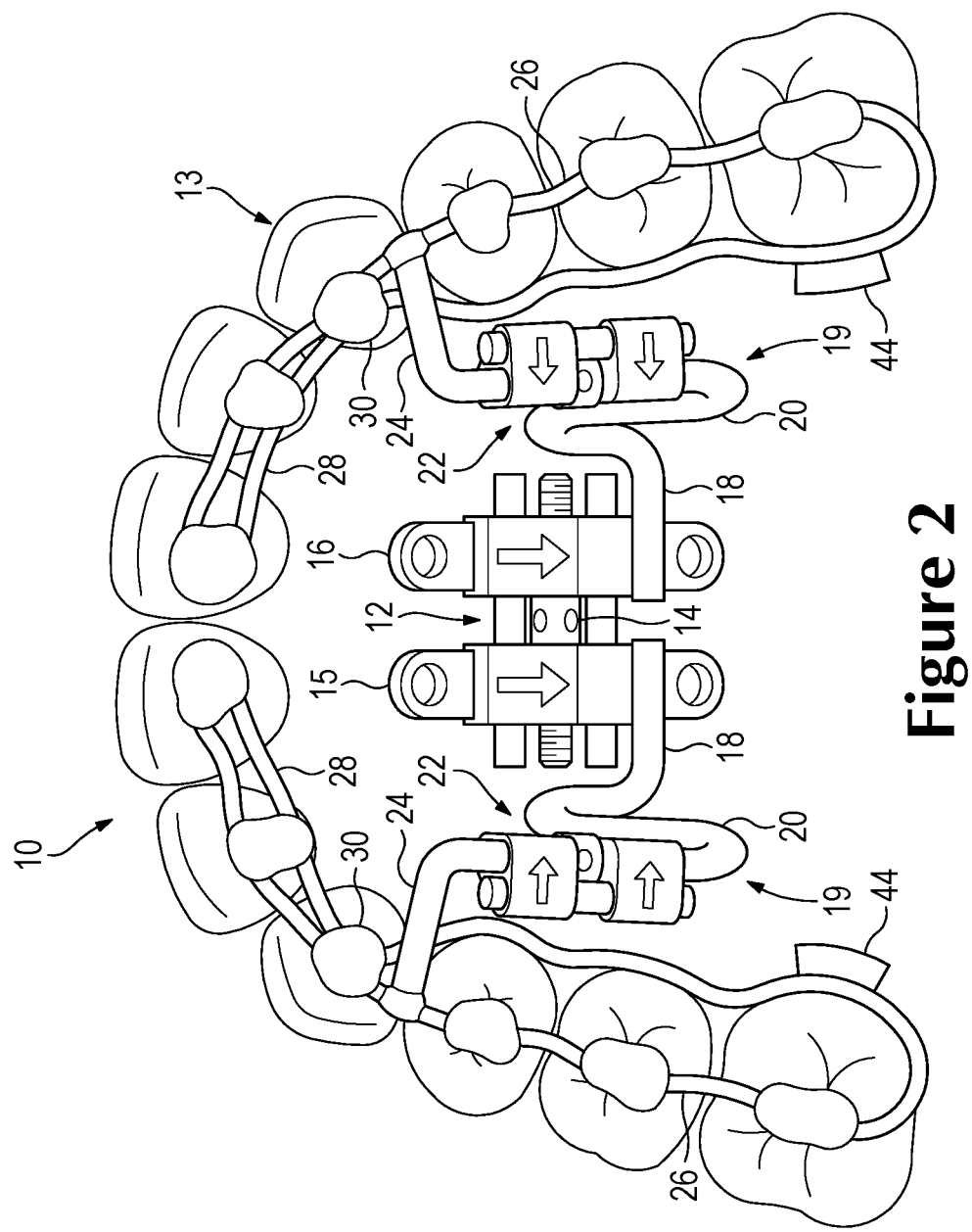
FIG. 2 is a bottom view of the maxillary pharyngorofacial expander of FIG. 1, shown attached to the upper teeth of a patient in a first step of a procedure to correct a malformed maxilla.

FIG. 2 shows expander 10 cemented to a patient's teeth 13. The workings of transverse expander assembly 12 and sagittal expansion sections 22, is described in U.S. Pat. No. 10,010,383 which is incorporated herein by reference as fully set forth herein. Expansion screws 14 and 23 are threaded in opposite directions on either side of their centers. Accordingly, turning the screws 14 and 23 in a first rotational direction brings together plates 15 and 16 for assembly 12 and like portions for expansion sections 22. Rotation in the opposite rotational direction forces plates 15 and 16 for assembly 12 and like portions of expansion sections 22 apart.

Figure 3:
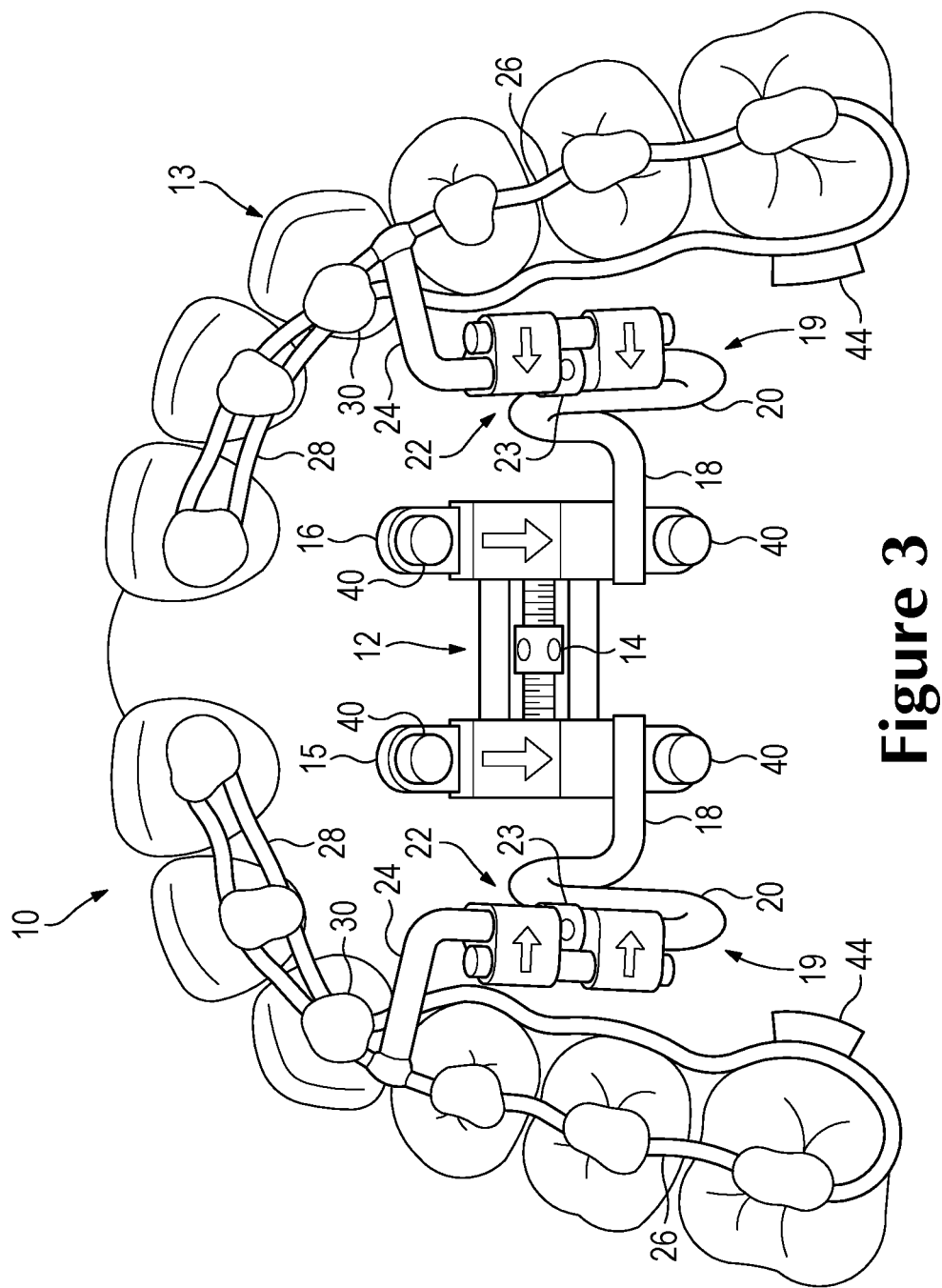
FIG. 3 is a bottom view of the maxillary pharyngorofacial expander of FIG. 2, after parallel transverse expansion, a further stage in the procedure to correct a malformed maxilla.

Referring now to FIG. 3, expander 10 is shown fully installed on a patient's upper palate and upper teeth, with temporary anchorage devices (TADS) 40 attaching left and right-side plates 15 and 16 to the palate. Further, expander assembly 12 has been expanded, pushing plates 15 and 16 apart, thereby transversely separating the two halves of the palate. As the palate separates, so do the upper teeth.

Figure 3A:
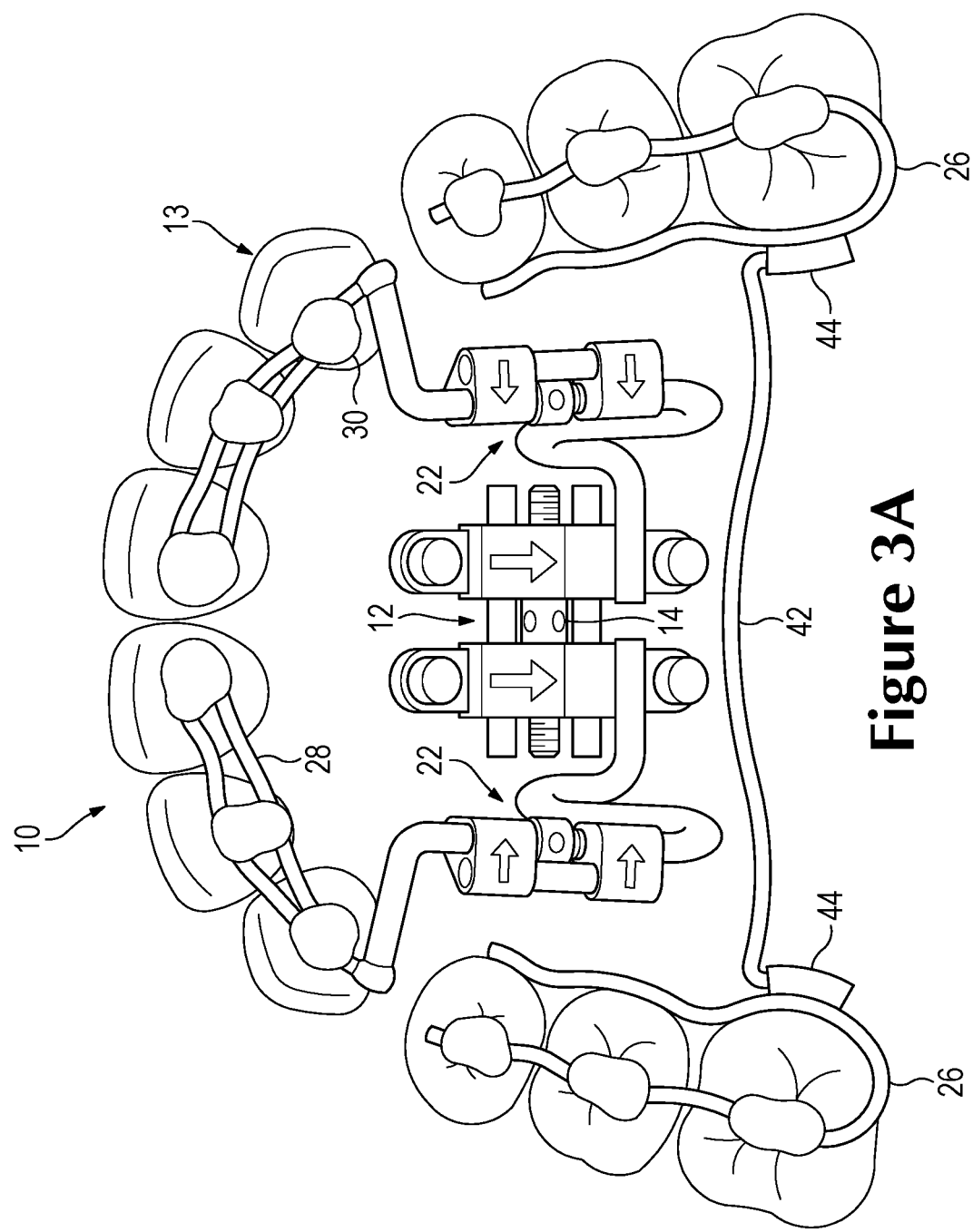
FIG. 3A is a bottom view of the maxillary pharyngorofacial expander of FIG. 3 in a reconfigured state for the purpose of bringing the front teeth together and move them forward.

In FIG. 3A, expander 10 has been reconfigured, with extension wire 28 severed from wire 26, thereby permitting the three front teeth on either side to be brought together by shortening transverse expander assembly 12 as shown. The front teeth have also been pushed forward by lengthening the sagittal expander assemblies 22. In addition, a transpalatal retention wire 42 is bonded into tubes 44 to maintain the expansion of the back of the upper jaw.

The many advantages of expander 10 should now be evident. The spring portion 20 of arm 19 reduces the initial force applied, permitting the upper jaw to expand at a slower rate, which is more comfortable to the patient. Further:

It is not always necessary to install TADS 40. If they are not installed, expander assembly 12, can be expanded or contracted to expand or contract, equally, the dentoalveolar halves of the upper jaw, by pressure of wires 26 and 28 against the teeth.

If only the left-side plate 15 or only the right-side plate 16 is attached by TAD 40 to the palate as boney anchorage, this permits the opposite right or left side dentoalveolar, respectively, to be pushed and expanded, thereby improving the buccal crossbite or lingual crossbite. Alternatively, the right or left side may be constricted, as desired.

If both left-side plate 15 and right-side plate 16 are placed symmetrically and attached to the palate by TADS 40, activation of the transverse expansion screw 14 will expand the boney palatal halves and dentoalveolar halves of the upper dentition equally. In this case utilizing the boney anchorage through TADS 40 and significant number of teeth as dental anchorage, effectively widens the upper maxillary halves and zygomatic bones and nasal bones and nasopharyngeal cavity and upper airway. The palate is joined together at its transverse center by bones that have interleaved portions. For younger patients, these bones can generally be separated by the gradual application of force. For older male patients, an initial surgery, cleaving the palate may be necessary.

With regular insertion of right-side plate 16 on the right side of palate and by placing left-side plate 15 closer to the center of the palate so that TADS 40 that extend through the left-side plate 15 engage the nasal septum, this enhances the anchorage on the left side. In this deployment, the left side of expander 10 is anchored not only by the boney palette, but also by the teeth and the nasal septum. This helps to keep the left side of maxilla stationary with no movement, while the right side of the maxilla, right nasal bone, right zygomatic bone, right side dental arch and right side of nasal cavity are expanded. This acts to correct maxillary skeletal and dentoalveolar asymmetries and unilateral constriction of the nasal cavity on the right side, in instances in which the right side requires correction of this nature. In this case, the distraction site will be between the junction of horizontal plates of right maxilla and palatal bone with nasal septum and left side horizontal plates of maxilla and palatal bone, with no distraction between the nasal septum and horizontal plates of maxillary and palatal bones on the left side. A parallel effect can be obtained by anchoring left-side plate 15 on the left side of the palate in a position where the left-side TADS 40 do not engage the nasal septum and the right-side plate 16 and its attaching TADS 40 on the right side of the palate are placed close to the center so that they do engage the nasal septum, thereby enhancing anchorage on the right side, and permitting correction of left-side asymmetries.

Figure 4:
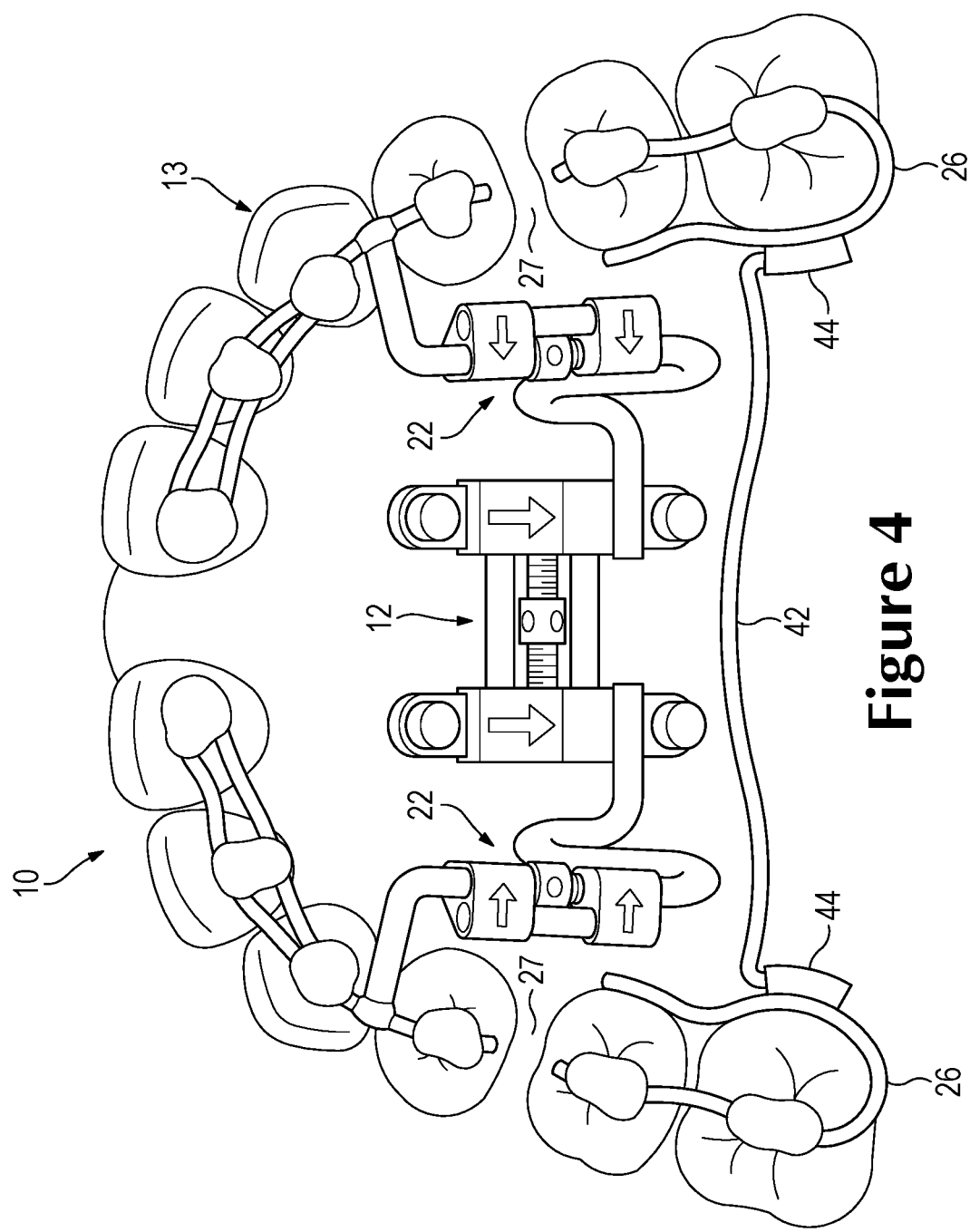
FIG. 4 is a bottom view of the maxillary pharyngorofacial expander of FIG. 3, shown as it appears in a further stage in the procedure to correct a malformed maxilla, wherein the occlusal wires have been cut, partially freeing the back teeth.

Referring now to FIG. 4, in a further step of the procedure to correct a malformed maxilla, lingual wire extension 26 has been cut on both sides of the palate, between the two rearmost teeth (molars) and the four forward teeth. This permits a separation of these sets of teeth. The gap 27 between the molars and the remaining bicuspid is progressively expanded by slowly expanding of sections 22 thereby pushing front teeth forward. Gap 27 can eventually be filled with an implant. Similar to the configuration shown in FIG. 3A, a trans-palatal retention wire 42 is bonded into tubes 44 to maintain the expansion of the back of the upper jaw. Freed from the rear teeth, the front teeth are advanced by expanding the sagittal expansion section 22, either symmetrically, if the patient's upper jaw is symmetrically formed, or asymmetrically, with the right sagittal expansion section 22 advanced farther or less far than the left sagittal expansion section 22, to correct an asymmetric upper jaw. By moving the front teeth forward a space is opened at the previous $2^{nd}$ bicuspid extraction sites 27, to accommodate an implant.

The spring portion 20 creates a stress reduction action between the transverse screw 14 activation and transverse force distribution to the occlusal wires 26 and lingual wires 28 to increase patient comfort. Further, in instances when neither plate 15 or 16 is attached to the palate or when just the left-side plate 15 or right-side plate 16 is attached, spring portions 20 reduce the chance of fracturing the occlusal bonding connection between occlusal wires 26 and lingual wires 28 to the surface of the teeth 13.

In a procedure to reshape the maxilla that may take several months to complete, after the palate has been fully expanded by means of the expansion of the transverse screw 14, a further set of steps are taken. In one option, TADS 40 on one side or both sides of the palate are tightened to touch plates 15 and 16, and this connection secured by adhesive. With a form of TAD 40 that has a fixed position relative to plate 15 (or 16), these plates 15, 16 may be pushed away from the palate, with this force being transferred through arms 19, and mitigated by spring portion 20, to pull or extrude the upper teeth further out of the gums. In the case of an asymmetrically developed set of teeth, this force may be specially directed to one portion of the upper teeth, by removing wire loops 28 or 26 on one or both sides of the mouth or by adjusting TADS 40 for plate 16 or 15, selectively. The extrusion force may be coupled with the other possible applications of force, described above.

An intrusion force (pushing teeth into the gums) by further tightening and palatal penetration of TADS 40 may also be applied on one side or both sides of the pharyngorofacial expander appliance. This force also is mitigated by spring portions 20 and may also be combined with other force application to the teeth to effect one of the following corrections:

intrude (push back into the bone) one side, front and back, to level the canted occlusal plane and close the posterior open bite on the opposite side;

intrude both sides of the upper jaw in the back to impact the upper posterior dentition to close an anterior open bite;

intrude both sides in front to improve a "gummy" smile or anterior deep bite; or intrude an all upper arch to reduce the excess lower facial vertical height and "gummy" smile.

Figure 5:
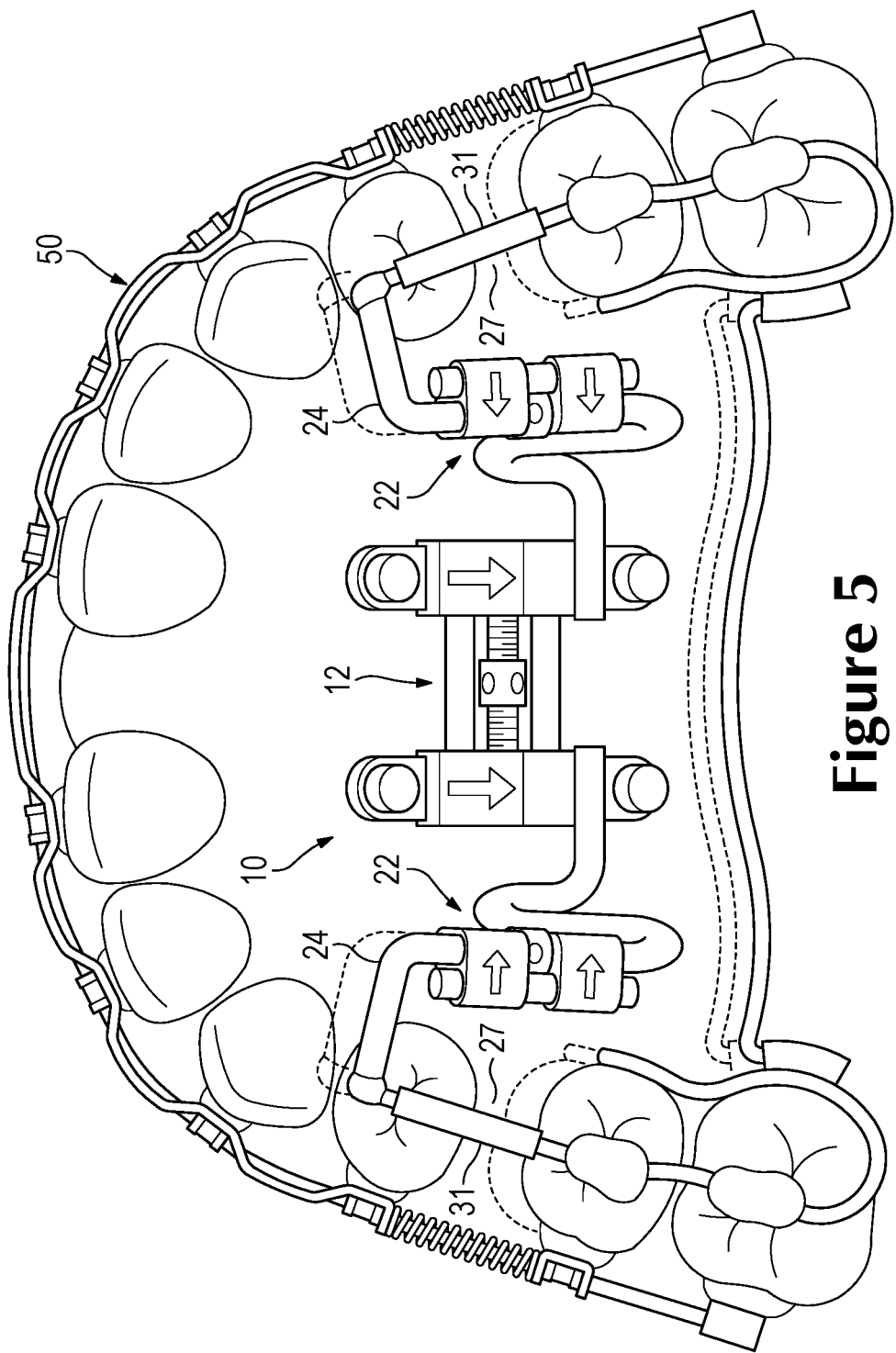
FIG. 5 is a bottom view of the maxillary pharyngorofacial expander of FIG. 4, at a further stage in the treatment process, where the portion of the lingual wire touching the front teeth has been removed and braces have been installed.

Referring to FIG. 5, expander 10 shown in a final form, in which arm 19 is now attached only to the two backmost teeth on either side, by way of connecting tube 31, attached to the distal wire 24. These teeth are distalized (pushed further back) by the contraction of sagittal expander sections 22, which again can be performed symmetrically, if the patients upper jaw is at this stage symmetric, or asymmetrically, if the patient has an asymmetric jaw that requires correction. As the two back teeth are pushed further back, a set of braces 50 may be installed to reshape the upper jaw. As noted previously, at the termination of this procedure, a gap 27 should be opened up on either side, sufficient to permit an implant to be implanted, replacing the extracted second bicuspids.

Figure 6:
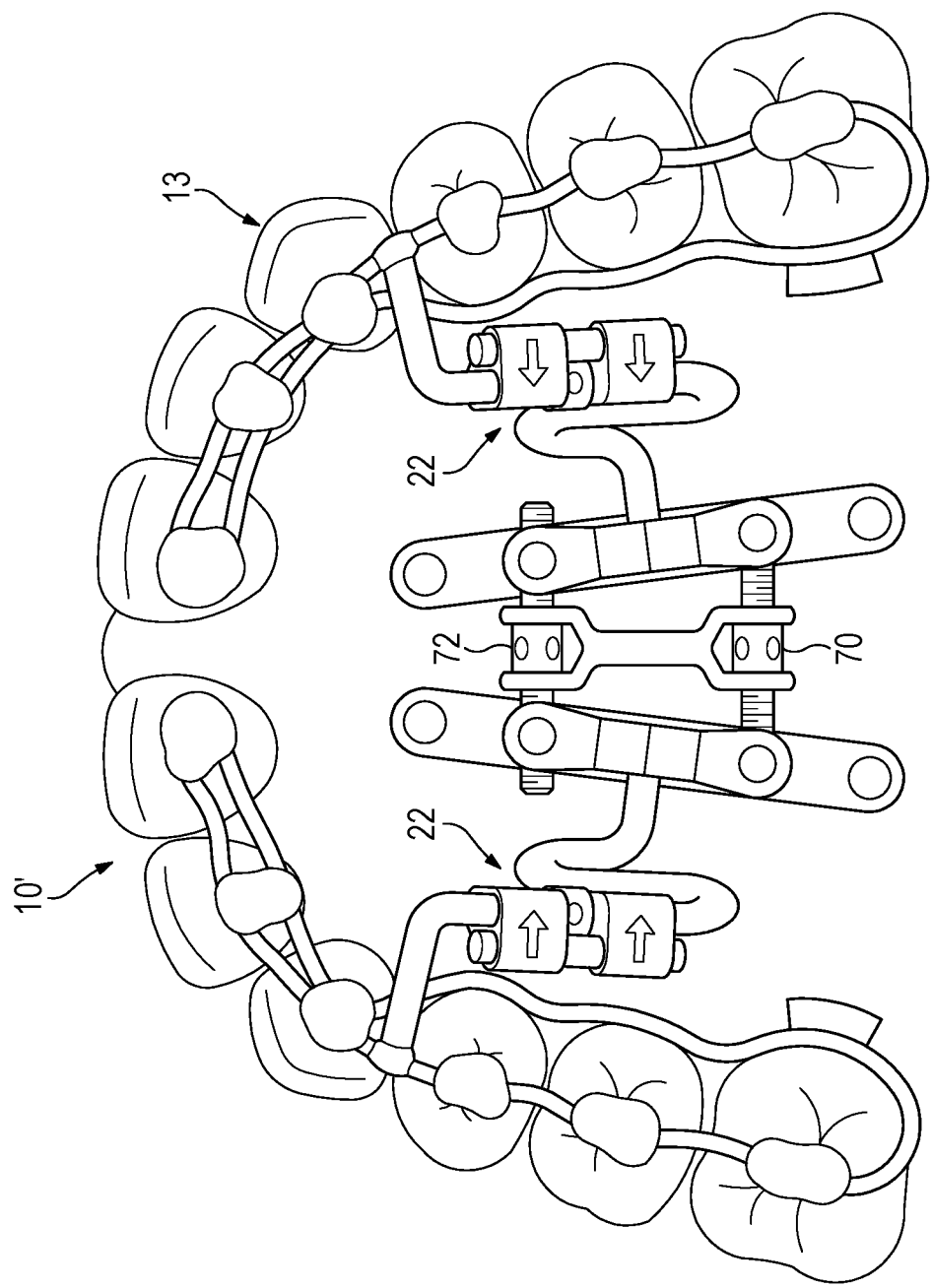
FIG. 6 is a bottom view of an alternative embodiment maxillary pharyngorofacial expander, permitting greater degrees of freedom in non-parallel transverse expansion.

FIG. 6 shows a second alternate embodiment of a palatal distractor 10'. The palate is joined at its center by a seam in which bone from either half is joined together in an interleaved microscopic dovetail pattern. Distractor 10' can be used to separate these halves by applying a separating force at the back using a rear expansion screw 70, while the front is constrained. Alternately, a separating force can be applied to the front using front expansion screw 72, while the back is constrained. Using this technique, the palate can be separated incrementally, and the interleaved microscopic dovetail disengage in a rough analogy to a zipper being unzipped or a door being "jimmied" open.

Figure 7:
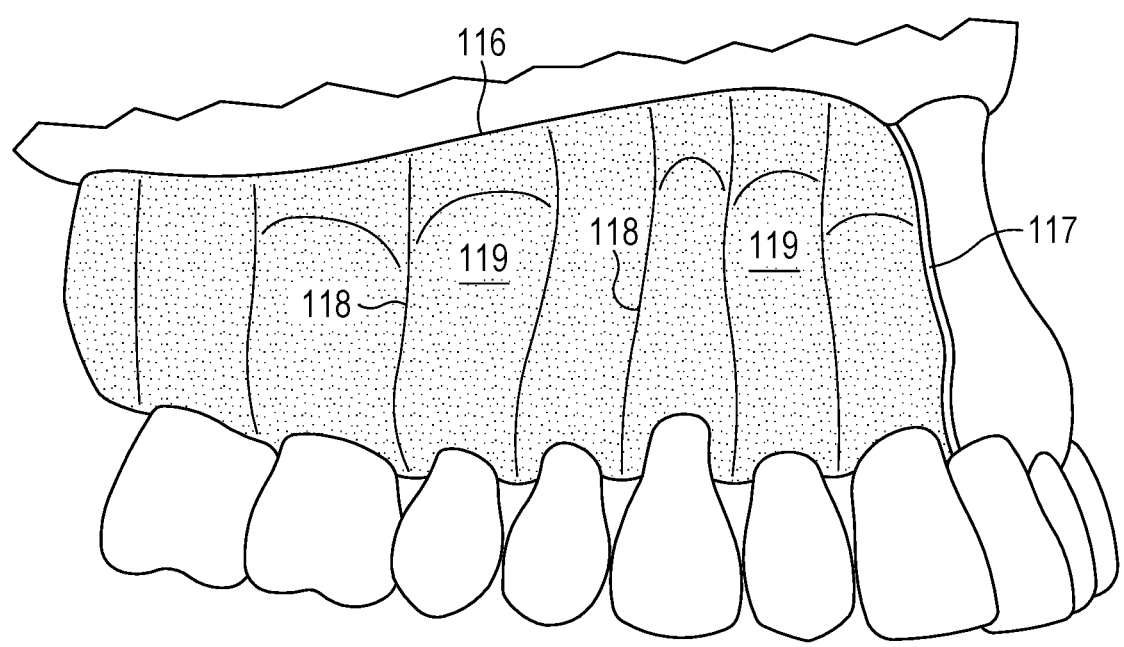
FIG. 7 is a side view of the upper teeth and gums, showing some of the locations of incisions performed as part of the surgical procedure known as "Osteogenic Distraction Nasomaxillary Expansion" (ODNE).

Referring now to FIG. 7, showing the surgical procedure for maxillary Osteogenic Distraction Nasomaxillary Expansion (ODNE), which may be performed as part of an overall procedure to correct a maxillary problem, in conjunction with the above described procedure utilizing distractors 10 or 10'.

This bone borne—tooth borne transpalatal distraction procedure in conjunction with buccal or lingual corticotomies and bone augmentation is introduced here, suggesting that combination of bone—borne and tooth—born devices and procedures may overcome some potential disadvantages of tooth—borne only devices, such as undesirable movements of the abutment teeth during expansion.

Various technical modifications are introduced here, with an emphasis on procedures that can be performed on an ambulatory outpatient basis without separation at the pterygomaxillary junction to avoid potential pterygoid plate fracture and ensuing complications.

Indications for the use of the ODNE procedure are skeletal maturity, unilateral or bilateral transverse deficiency, sagittal maxillary deficiency, nasal and retropalatal upper airway deficiency, unilateral or bilateral excessive display of buccal corridors when smiling, narrow palate with insufficient space for the upper tongue positioning and anterior crowding. Any clinical situation in which orthodontic expansion has failed should be evaluated for potential sutural resistance to expansion. For many clinicians, the patient's age and the degree of skeletal maturity are the basis for considering nonsurgical expansion rather than ODNE. It has been shown that ossification of the midpalatal suture has wide variations in various age groups. In general, ODNE is recommended for patients over 11 years of age or younger patients with moderate to severe obstructive sleep apnea suffering from anatomical discrepancies that was mentioned immediately above.

ODNE is also indicated as phase 1 surgery in the early stage of orthodontic arch alignment and in preparation for future maxillary osteotomies for other vertical and antero-posterior (AP) discrepancies. In addition, it may help obviate the need for complex segmentalization of the maxilla and hence avoid complications associated with segmental osteotomies.

In summary, indications for ODNE include: 1. Increasing the maxillary arch perimeter so as to correct unilateral or bilateral posterior crossbite, with or without additional surgical procedures for other discrepancies. 2. Increasing the maxillary transverse width, especially when the transverse discrepancy is greater than 5 mm. 3. Alleviating dental crowding when bicuspid extractions are not indicated. 4. Reducing excessively prominent and visible unilateral or bilateral buccal corridors when smiling. 5. Overcoming resistance at the sutures and bony articulations when orthopedic maxillary expansion has failed. 6. Increasing the maxillary sagittal dentoalveolar length, especially when the sagittal discrepancy is less than 5 mm. 7 Decreasing the maxillary vertical dentoalveolar height and lower facial vertical height, especially when the vertical discrepancy is less than 5 mm. 8 Increasing the nasomaxillary, retropalatal and retroglossal transverse and sagittal airway volume increase.

The determination of maxillary transverse discrepancy is based on identification of the problem as absolute or relative. An absolute transverse discrepancy is a true horizontal width deficiency in the maxilla, whereas a relative transverse discrepancy is a result of the discrepancy in the maxilla or both jaws in the AP plane. Placing diagnostic models in Class I occlusion can be helpful for differentiating between absolute and relative transverse discrepancy. It also can yield valuable information about the location and nature of a maxillary transverse constriction.

To diagnose maxillary hypoplasia properly, a detailed clinical examination is performed and measurements are taken. In addition, postroanterior (PA) cephalometric radiographs can be used to identify transverse skeletal discrepancies between the maxilla and the mandible. With the advent of three-dimensional (3D) imaging techniques and the availability of cone beam computed tomography (CBCT) in surgery offices, clinicians now can evaluate the actual dimensions of apical bases at different levels of the alveolar ridge in the maxilla. A radiographic survey, clinical examination, model analysis using diagnostic casts held in Class I occlusion, and a detailed arch length analysis provided by orthodontists can provide the means to quantify the parameter for expansion.

Orthopedic maxillary expansion in a skeletally mature patient may lead to undesirable effects on the surrounding hard and soft tissues, in addition to unstable dental compensations due to alveolar tipping, not to mention total failure of expansion. Therefore, it is prudent to determine the patient's skeletal maturity and to monitor the initial response to an orthopedic expansion and force application. A prompt decision must be made to proceed with ODNE if resistance to expansion due to skeletal maturation is suspected.

Limitations and Contraindications: There is no absolute contraindication to ODNE. However, the procedure is relatively contraindicated in patients with significant coagulopathy, which may increase the risk of severe bleeding. Just as with any surgical procedure, measures are taken to correct coagulation abnormalities and to optimize the patient's medical condition before surgery. Patients with generalized periodontal disease and a heavy smoking habit should be informed about the potential loss of gingival attachment in the maxillary anterior region. Patient selection is important in determining the type of anesthesia to be used (i.e., intravenous or general anesthesia); the osteotomy design (pterygoid and/or nasal septum osteotomy) also may influence the decision for a type of anesthesia that is appropriate for the procedure.

As does any other surgical procedure, ODNE has a relapse rate of 5% to 28%, and some overexpansion and over-advancement should be considered to account for relapse.

ODNE Technique: Either oral right angle endotracheal (RAE) tube or nasoendotracheal intubation can be used. If a palatal osteotomy is planned, oral (RAE) endotracheal intubation with the tube taped to the lip commissure provides the best access and reduces the risk of inadvertently cutting into the nasal tube when making the midpalatal cut. Neurosurgical patties are soaked in either oxymetazoline solution or 4% topical cocaine and packed into the bilateral nares for hemostasis.

Step 1: Injections of a local anesthetic with vasoconstrictor are administered, including local infiltrations into the maxillary vestibule and also greater palatine, infraorbital, and nasopalatine nerve blocks. A buccal vestibular incision is made in the alveolar mucosa approximately 2 to 3 mm from the mucogingival junction. The incision is carried from the second molar to the second molar on the contralateral side. Subperiosteal dissection is performed to the piriform aperture and extending anterior to the midline and posteriorly to the pterygomaxillary junction. A #9 periosteal elevator is left medial to the piriform rim and a reverse Langenbeck retractor is placed in the pterygomaxillary fissure to protect the soft tissue. A buccal osteotomy is made from the pterygomaxillary junction to the piriform rim anteriorly, using a reciprocating saw.

Step 2: Buccal Osteotomy, A reciprocating saw is used to make a horizontal osteotomy cut across the anterior maxillary wall and through the posterior lateral maxillary wall. The cut must be made 4 to 5 mm from the apices of the maxillary dentition and parallel to the occlusal plane. A buccal osteotomy 116 is made from the pterygomaxillary junction to the piriform rim anteriorly, using a reciprocating saw.

Step 3: Midline Osteotomy: A vertical midline incision 117 is made in the alveolar mucosa between the maxillary central incisors, and a #9 periosteal elevator is used to reflect the soft tissue just below the anterior nasal spine. As a fine straight osteotome is gently tapped into the interseptal bone between the two maxillary central incisors, the nondominant index finger is placed intraorally over the anterior maxilla to feel the leading edge of the osteotome breaking through the palatal cortical bone. To ensure complete mobilization of the maxillary segments, gentle rotation of the fine straight osteotome results in a symmetric mobility and separation between the maxillary central incisors. An expansion device is activated to expand the maxilla at the midpalatal suture and the osteotome is driven posteriorly to the midpalatal suture.

Step 4 Alveolar corticotomies 118, are defined as a surgical intervention limited to the cortical portion of the alveolar bone. Whereas in osteotomies both cortical and trabecular bone material is cut in considerable quantities. In this step, the incision must pierce the cortical layer, and at the same time, penetrate into the bone barrow only minimally.

The traditional surgical access for the procedure calls for sulcular incision within the papilla and reflecting the papillary-gingival components to access the alveolar unrestricted access to the interdental bone and coronal portions of the proposed surgical sites, it does significantly increase the chances of gingival recession and root exposure specially in adult and older patients. Thus, subjecting them to further surgical interventions for soft tissue grafting of root exposure. An alternative approach proposed above with better success to create a circumvestibular incision approach that most oral and maxillofacial surgeons are comfortable performing as described above. After apical reflection of the soft tissues, the surgeon can proceed in a tunneling fashion to approach the coronal segments of the dentoalveolar segments and reflecting these tissues without disturbing the papillary complex.

A combination of both a surgical thin fissure bur or piezoelectric scalpel under coolant irrigation is used to perform vertical interdental osteotomy by creating a 0.5-1 mm depth osteotomies 118 in between the root/alveolar bone segments from second molar to contra lateral second molar extending vertically up to the horizontal circumvestibular buccal maxillary osteotomy cut 116 that was already performed unilaterally or bilaterally and explained above. The depth of cuts is usually judged visually as the bleeding bone is the proposed ideal level of osteotomies. In the coronal interdental aspect (near the CEJ) of the teeth, the surgeon may encounter more resistance in the bone architecture. It is important to allow the Piezo scalpel to do the cutting and excessive pressure will result in heat generation and thus gingival recession and periodontal compromise will result. Also, thin chisel osteotomes can be used to further define the vertical cuts 118 if necessary. The key to success is being very gentle to the soft tissue components and gentle reflection of the tissues while interdental osteotomies are being performed. The surgical sites are typically then well irrigated and checked for areas of inadequate osteotomies which may need further defining. At this point a small round bur placed on an angled handpiece and using gentle pressure, multiple perforations 119 are performed over the alveolar bone segment of each root from second molar to contralateral lateral second molar. The depth of these perforations is approximately 0.5 mm to the bleeding surface of bone. We recommend supplementation of platelet rich fibrin prepared with patient's autologous blood and prepared 15 to 20 minutes prior to the osteotomy completion. Cortico-cancelous bone chips are then hydrated or mixed with patient's donated blood or fibrin fragments and applied over the buccal aspects of the bony segments. The platelet fibrin clots are applied over the bone grafts and collagen membranes can be used for further graft facilitation following the guided bone regeneration protocols. The wounds are then closed via a preferred choice.

Step 5: Wound Closure All wounds are irrigated free of debris and closed using 30 polyglycolate or non-resorbable 4-0 or 5-0 Vicryl sutures running or interrupted for the buccal vestibular and midline incisions.

Step 6: Insertion of two to four temporary anchorage devices (TADs) 40

Step 7: Activation of the pharyngorofacial expander is seated using a glass ionomer or composite cement, and the expander is activated with one or two quarter turns to make sure activation occurs without resistance.

Depending on the surgeon's preference and experience, the latency period can be eliminated with immediate expansion or can last up to 5 days. Special consideration is required for patients with very little interseptal bone radiographically and those with thin gingival papilla between the maxillary central incisors. When less than ideal periodontal support is a factor, a longer latency period and slower activation may be more beneficial than immediate activation and the regular expansion rate of 1 mm per day.

The expansion (distraction osteogenesis) is started by activation of transverse screw 14 right away or 5 to 7 days postop to let the blood clot organize itself into a soft callus. The distraction is done at the rate four turns up to 1 mm daily for the first few days until space open between upper central incisors then reduced to 0.5 mm per day until the desired dimension is obtained. The separation between both incisors indicates that an adequate disjunction of both hemimaxillas was performed. This freshly created space between both incisors will close progressively while the gingival fibers, which are stretched during the expansion, will go back to their normal size. Since they are attached to teeth by cementum, the teeth will then move into this empty space. The installation of brackets will complete the closing of the diastema.

After the completion of the transverse expansion the sagittal expansion starts with activation of sagittal screws 23 unilaterally or bilaterally with rate of 1 turn 0.4 mm every 3-4 days to maximum advancement of the dentoalveolar to 4-5 mm.

A typical postoperative schedule looks like this: •4 days later appliance is activated and advanced for first time, instructions are given to patient to activate the appliance 1 turn equal to 0.25 mm, every 3-4 days •1 week later the space that is being created between two front teeth is checked and the bite is checked. •After another week, the separation of teeth and the bite are checked one more time and activation is stopped. •Patient returns to the orthodontist for a check. •The appliance remains in place for 3 months without further activation. •Orthodontic treatment is then resumed.

Alternative Technique: Pterygoid Disjunction and Unilateral DONE At the surgeon's discretion, a curved osteotome may be used to separate the pterygomaxillary junction. A fine straight osteotome can be used to ensure proper bony separations at the piriform rim and the lateral and posterior walls of the maxilla.

If the patient has a unilateral transverse maxillary deficiency, unilateral DONE can be used. A vertical interdental osteotomy is made at the anterior border of the segment to be expanded, using a spatula osteotome driven to the mid-palatal suture 117. A horizontal buccal osteotomy is made 116 to connect to the vertical osteotomy 117. The remaining steps are the same as for bilateral DONE In an alternative technique as outpatient technique a customized pharyngoesophageal expander of FIG. 1 is made for patient. Posterior holes of the transverse expander 3 made 5 mm away from the soft tissue and the anterior holes 2 mm from tissue, both front and back holes position just 2 mm away from the midline on each side. The appliance gets bonded just by bonding in $2^{nd}$ bicuspids to stabilize the appliance two TADs installed with local anesthesia just in the posterior holes. The posterior TADs screwed into the holes up to 2 mm from the tissue. This facilitates the intrusion of the back teeth bilaterally and creates open bite of 3 mm bilaterally. After this stage is completed in inpatient appointment under general anesthesia the appliance will be removed in operatory. A paramedian palatal incision and osteotomy is used bilaterally approximately 5 mm lateral to the midpalatal suture. Two cuts are joined in the midline at a point posterior to the incisive canal. Palatal Osteotomy Starting from the posterior edge of the hard palate, a reciprocating saw is engaged to make a palatal cut approximately 5 mm lateral to the midpalatal suture bilaterally on each side of midpalatal suture, all the way to the point just posterior to the incisive canal. On the contralateral side, a second paramedian cut is made approximately 5 mm lateral to the midpalatal suture. The two cuts are joined in the midline at a point posterior to the incisive canal. The cuts in the roof of the mouth are sutured now and the appliance will be inserted back to the mouth just by two bonding on $2^{nd}$ bicuspids just to stabilize the appliance from moving. The new TADS will be reinserted up to the touching the holes on the appliance. A buccal vestibular incision is made in the alveolar mucosa approximately 2 to 3 mm from the mucogingival junction. The incision is carried from the second molar to the second molar on the contralateral side. Subperiosteal dissection is performed to the piriform aperture and extending anterior to the midline and posteriorly to the pterygomaxillary junction. A #9 periosteal elevator is left medial to the piriform rim and a reverse Langenbeck retractor is placed in the pterygomaxillary fissure to protect the soft tissue. An osteotomy is made bilaterally from the piriform rim anteriorly to the horizontal cut already made posterior to incisal canal in the anterior floor of the nose using a reciprocating saw. An osteotomy is made with a curved chisel at the pterygomaxillary junction and another cut made from the pterygomaxillary junction to the piriform rim anteriorly, using a reciprocating saw. Buccal Osteotomy, A reciprocating saw is used to make a horizontal osteotomy cut across the anterior maxillary wall and through the posterior lateral maxillary wall. The cut must be made 4 to 5 mm from the apices of the maxillary dentition and parallel to the occlusal plane. A buccal osteotomy 116 is made from the junction to the piriform rim anteriorly, using a reciprocating saw. Pterygomaxillary junction will be cut and separated bilaterally by curve osteotomes. A #9 periosteal elevator is used to reflect the soft tissue just below the anterior nasal spine. As a fine straight osteotome is gently tapped into the interseptal bone between the two maxillary central incisors, separating the midpalatal suture extending to the horizontal cut already made posterior to incisive canal, the nondominant index finger is placed intraorally over the anterior maxilla to feel the leading edge of the osteotome breaking through the palatal cortical bone. To ensure complete mobilization of the maxillary segments, gentle rotation of the fine straight osteotome results in a symmetric mobility and separation between the maxillary central incisors. The 2 halves of the maxilla now are free to move. Post operatively the appliance will be fully bonded to the front and back teeth. The activation of sagittal screws 23 unilaterally or bilaterally, symmetrically or asymmetrically by taking anchorage from the midsection of the palate attached to the nasal septum, will advance the maxillary bones, attached soft palate dentoalveolar sections and upper lip to the desired anteroposterior position with activation of the sagittal screws 2 times equivalent to 0.5 mm a day. After completion of this stage under local anesthesia for upper TADs removed from the pharyngorofacial expander and 2 additional TADs installed between the roots of teeth 19 and 20, 29 and 30 (in the Universal Tooth Numbering System). The transverse screw 14 is activated twice daily 0.5 mm a day until the desired expansion with over expansion of 2 mm bilaterally. This expansion creates distraction of the palate at the site of sagittal cuts previously done 5 mm on each side of the midpalatal line. This can be bilaterally or unilaterally symmetrically or asymmetrically by removal of all TADS or keeping the one on the side that does not need expansion. At the same time patient wears heavy elastic bands from upper molars to the TADs installed mesial to the lower first molars as vertical elastics. This maintains the new sagittal position of advanced maxillary structures and also help to distract the posterior part of the maxilla vertically down to obtain proper occlusion by closing the posterior open bite. This facilitates vertical development of posterior nasal valves.

While various embodiments have been illustrated and described, it will be appreciated that various changes can be made therein without departing from the spirit and scope of the claimed subject matter.

The invention claimed is:

1. A palatal expander having a front and a back and comprising:
   a. a pair of transversely spaced palatal attachment plates, joined together by an expansion mechanism for changing the transverse spacing between said palatal attachment plates, each plate including at least one throughhole to facilitate attachment to the palate;
   b. right and left jaw attachment portions, formed so as to be closer together at said front of said palatal expander and further apart at said rear of said palatal expander, respectively;
   c. a pair of arms, each having a first wire portion attached to a said palatal attachment plate, a sagitally oriented expander section, attached to said first wire portion and a second wire portion attaching said sagitally oriented expander portion to said jaw attachment portion and wherein a section of said first wire portion is curved to form a spring portion.

2. The palatal expander of claim 1, wherein each said first wire portion is curved in the shape of a curl to form said spring portion.

3. The palatal expander of claim 1, wherein each said first wire portion is curved in the shape of a U-shape to form said spring portion.

4. The palatal expander of claim 1, wherein each said first wire portion is curved in the shape of a curved zig-zag to form said spring portion.

5. A method of applying a set of forces to the upper jaw of a patient, comprising:
   a. providing a palatal expander, including:
      i. a right and a left palatal attachment plate, joined together by a transverse expansion mechanism, for changing the transverse spacing between said right and left palatal attachment plates;
      ii. a right jaw attachment portion and a left jaw attachment portion, spaced from said pair of transversely spaced palatal attachment plates;
      iii. a first right stiff wire and a first left stiff wire, each attached to and extending transversely from a said right and a said left palatal attachment plate, respectively, and terminating in a sagitally oriented stiff wire section;
      iv. a right sagittal expansion mechanism connected to said right sagitally oriented stiff wire section and a left sagittal expansion mechanism connected to said left sagitally oriented stiff wire section;
      v. a second right stiff wire and a second left stiff wire, connecting said right and left sagittal expansion mechanism to said right and left jaw attachment portion, respectively;
   b. attaching said right and a left palatal attachment plates to said patient's palate;

c. attaching said right jaw attachment portion to said patient's right upper teeth, and attaching said left jaw attachment portion to said patient's left upper teeth; and d. adjusting at least one of said transverse expansion mechanism, said right sagittal expansion mechanism and said left sagittal expansion mechanism, thereby applying a selected force to said patient's upper teeth.

6. The method of claim 5, wherein at least one of said first and second right stiff wire is curved to form a spring portion.

7. The palatal expander of claim 6, wherein said spring portion is in the shape of a curl.

8. The palatal expander of claim 6, wherein said spring portion is U-shaped.

9. The palatal expander of claim 6, wherein said spring portion is shaped as a curved zig-zag.

10. The method of claim 5, wherein said left stiff wire, said left sagittal expansion mechanism and said left jaw attachment portion form a left arm, and wherein said left arm includes a spring portion, adapted to reduce force applied to said upper jaw when said at least one of said transverse expansion mechanism, said right sagittal expansion mechanism or said left sagittal expansion mechanism is adjusted.

11. The method of claim 5, wherein said right and said left palatal attachment plates each include apertures for permitting temporary anchorage devices to be used to attach said plates to the palate, and wherein one or both of said palatal attachment plates are attached to said palate by means of temporary anchorage devices.

12. The method of claim 5, including a step of expanding said right sagittal expansion mechanism.

13. The method of claim 5, wherein adjusting at least one of said transverse expansion mechanism, said right sagittal expansion mechanism and said left sagittal expansion mechanism, thereby applying a selected force to said patient's upper teeth, comprises expanding said left sagittal expansion mechanism.

14. The method of claim 5, wherein said right jaw attachment is attached to all of the upper right teeth of said patient.

15. A method of applying a set of forces to the upper jaw of a patient, comprising:

a. providing a palatal expander, including:
  i. a right and a left palatal attachment plate, joined together by a transverse expansion mechanism, for changing the transverse spacing between said right and said left palatal attachment plates, and wherein said right and said left palatal attachment plates each include apertures for permitting temporary anchorage devices to be used to attach said plates to the palate;
  ii. a right arm comprising stiff wire extending from said right palatal attachment plate and a left arm comprising stiff wire extending from said left palatal attachment plate, said stiff wire of both said right and said left arm being bent to form a spring portion;
  iii. a right jaw attachment portion attached to said right arm and a left jaw attachment portion attached to said left arm;

b. attaching said right and said left palatal attachment plates to said patient's palate using temporary attachment devices;

c. attaching said right jaw attachment portion to all of said patient's upper right teeth, and attaching said left jaw attachment portion to said patient's upper left teeth; and d. tightening said temporary anchorage devices to apply an intrusive force to said upper teeth, said spring portions reducing initial force after said tightening.

16. The palatal expander of claim 15, wherein each said stiff wire of both said right and said left arm being curved in the shape of a curl to form said spring portion.

17. The palatal expander of claim 15, wherein each said stiff wire of both said right and said left arm being curved in the shape of a U-shape to form said spring portion.

18. The palatal expander of claim 15, wherein each said stiff wire of both said right and said left arm being curved in the shape of a zig-zag to form said spring portion is shaped as a curved zig-zag.

* * * * *